Figure 1:
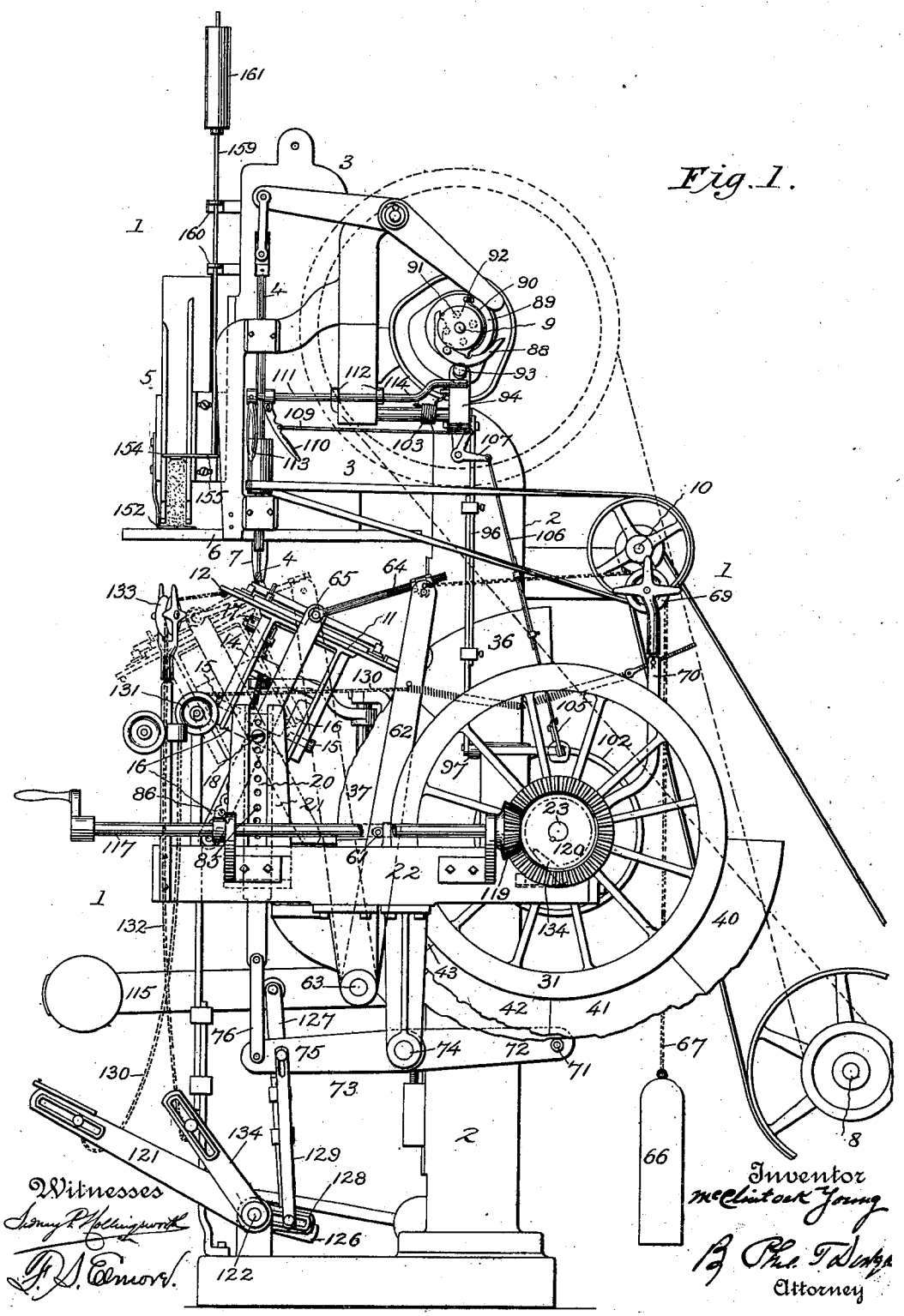

No. 664,989. Patented Jan. 1, 1901.
McCLINTOCK YOUNG.
WORK FEEDING MECHANISM FOR BRUSH MACHINES.
(Application filed May 11, 1900.)
(No Model.) 9 Sheets—Sheet 1.

No. 664,989. Patented Jan. 1, 1901.
McCLINTOCK YOUNG.
WORK FEEDING MECHANISM FOR BRUSH MACHINES.
(Application filed May 11, 1900.)
(No Model.) 9 Sheets—Sheet 4.

No. 664,989. Patented Jan. 1, 1901.
McCLINTOCK YOUNG.
WORK FEEDING MECHANISM FOR BRUSH MACHINES.
(Application filed May 11, 1900.)
(No Model.) 9 Sheets—Sheet 5.
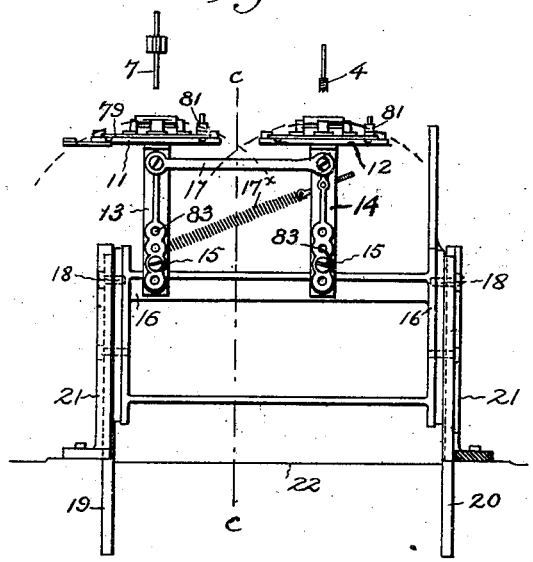
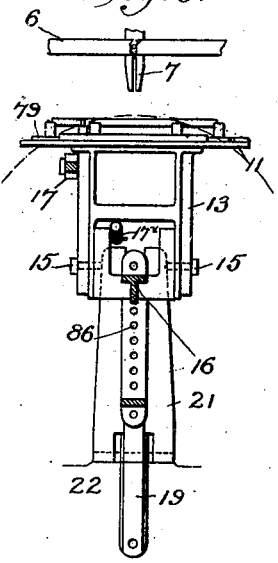
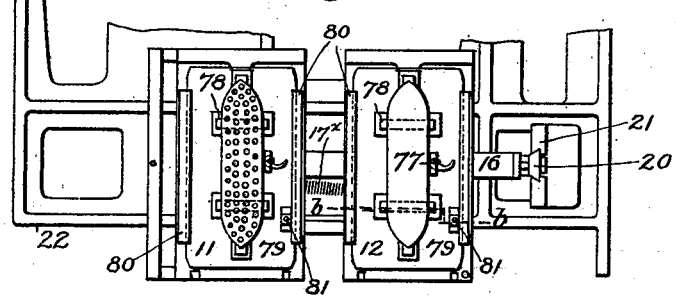
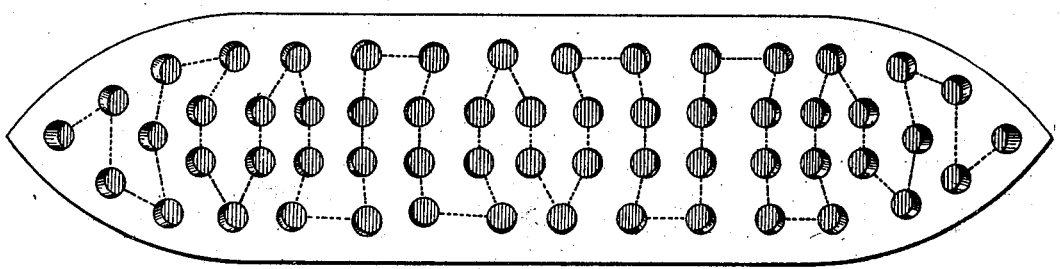

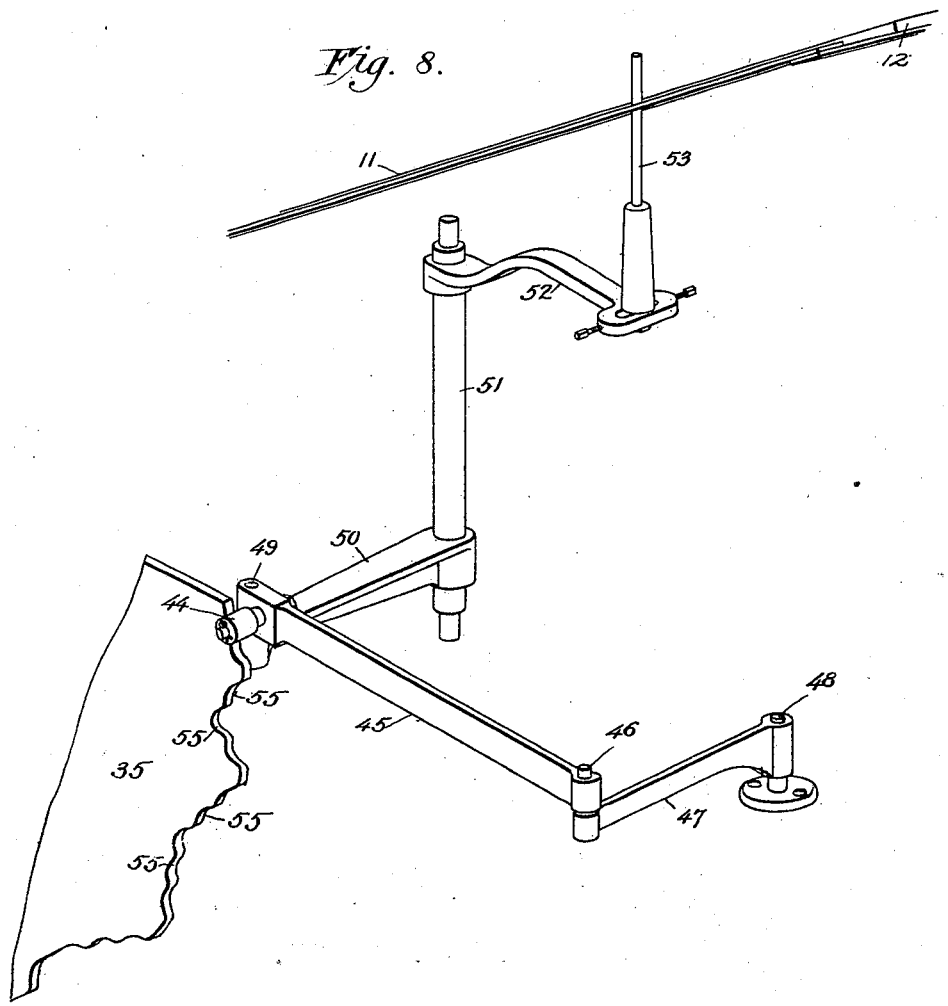

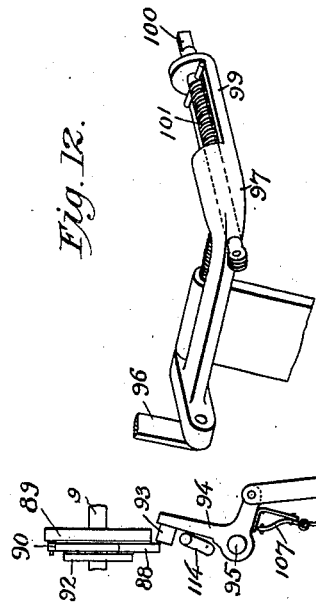
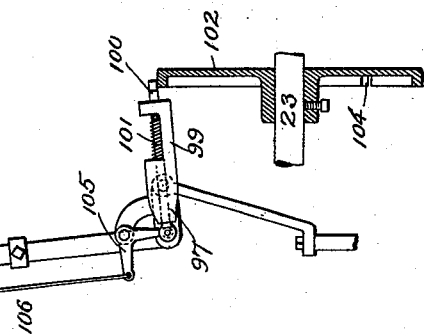
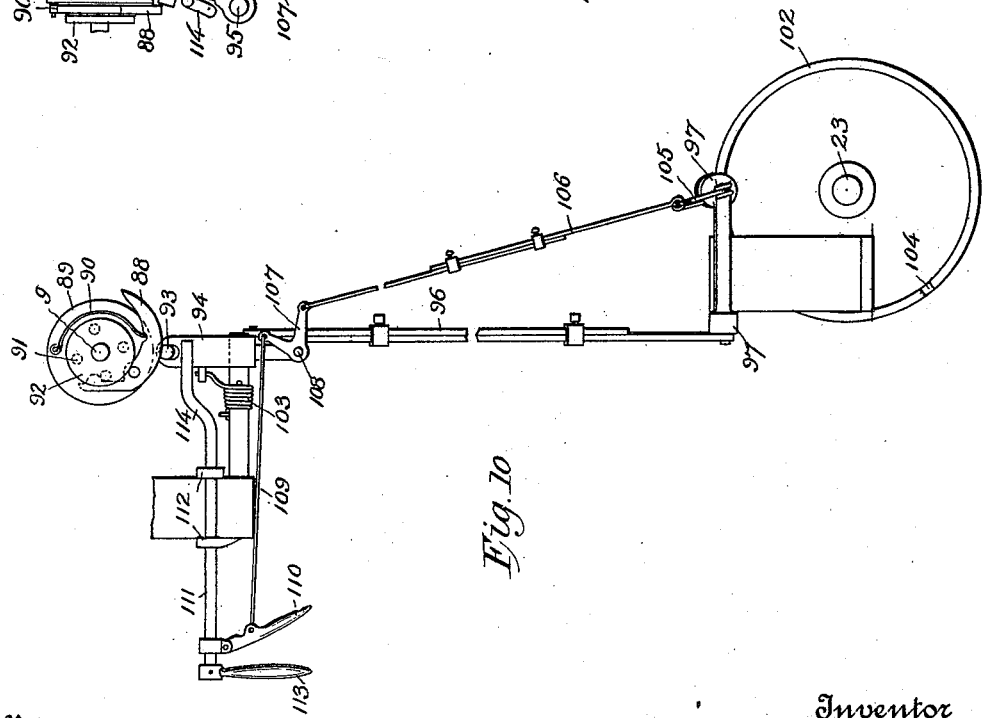

No. 664,989. Patented Jan. 1, 1901.
McCLINTOCK YOUNG.
WORK FEEDING MECHANISM FOR BRUSH MACHINES.
(Application filed May 11, 1900.)
(No Model.) 9 Sheets—Sheet 8.
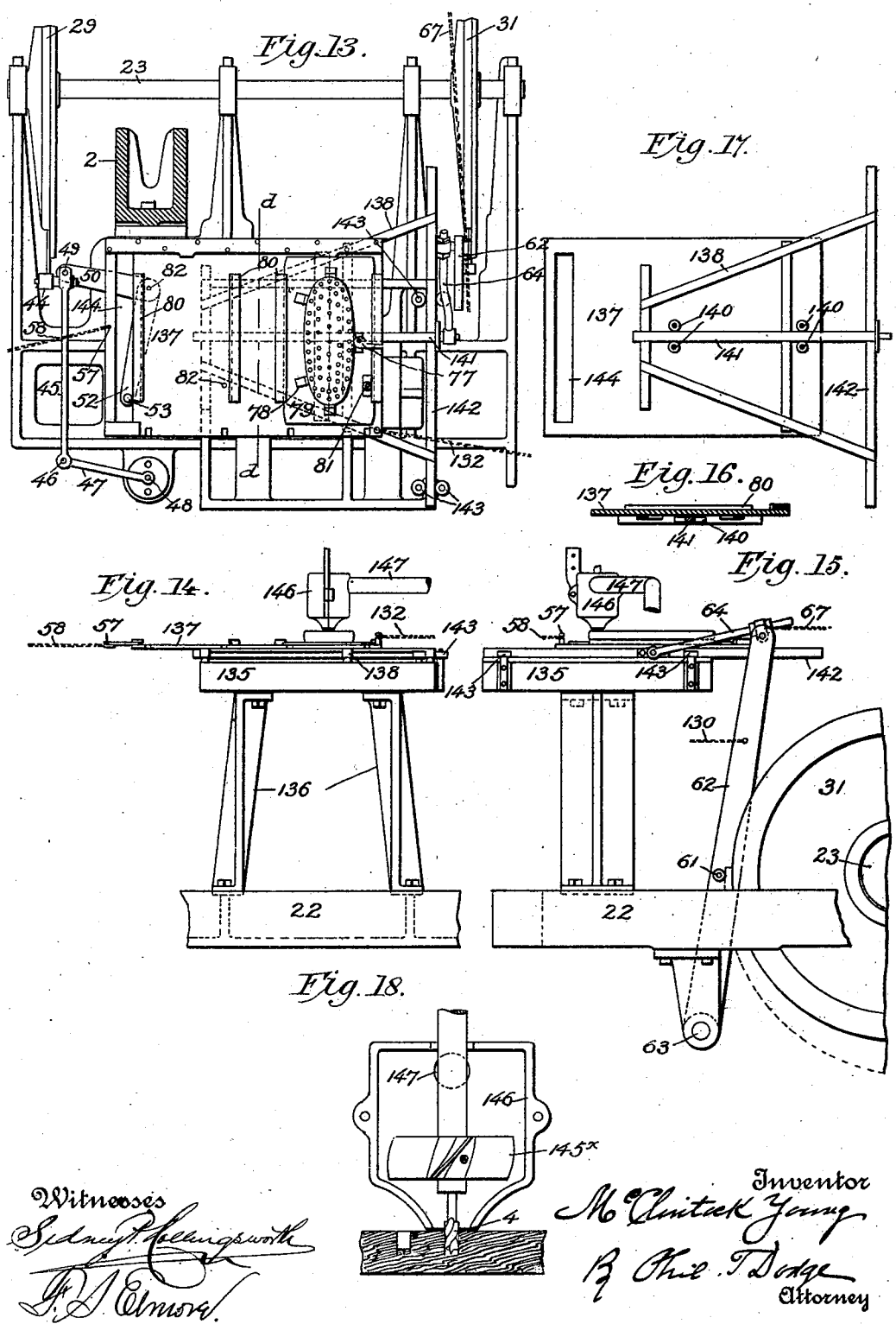

No. 664,989. Patented Jan. 1, 1901.
McCLINTOCK YOUNG.
WORK FEEDING MECHANISM FOR BRUSH MACHINES.
(Application filed May 11, 1900.)
(No Model.) 9 Sheets—Sheet 9.

UNITED STATES PATENT OFFICE.

McCLINTOCK YOUNG, OF FREDERICK, MARYLAND, ASSIGNOR TO THE PALMETTO FIBRE COMPANY, OF ILLINOIS.

WORK-FEEDING MECHANISM FOR BRUSH-MACHINES.

SPECIFICATION forming part of Letters Patent No. 664,989, dated January 1, 1901.

Application filed May 11, 1900. Serial No. 16,376. (No model.)

*To all whom it may concern:*

Be it known that I, McCLINTOCK YOUNG, of Frederick, county of Frederick, and State of Maryland, have invented a new and useful Improvement in Work-Feeding Mechanisms, of which the following is a specification.

This invention has reference mainly to a feeding mechanism designed more particularly for feeding brush-blocks in brush-machines successively and automatically in predetermined positions to receive the tufts.

The invention is intended, preferably, for application to brush-machines, such as represented, for instance, in United States Patent No. 578,907, granted to me on the 16th day of March, 1897, wherein a boring-tool and tufting mechanism operate side by side, the former acting to form the holes in a blank block and the latter operating to simultaneously and with each boring operation insert a tuft in a corresponding hole in a previously-bored block, the blocks of this machine being shifted in holders by hand to bring them successively in the proper predetermined positions.

The present invention comprises a mechanism for automatically feeding the blocks to the successive predetermined positions beneath the borer and tufter, and embodies mainly a peculiar construction for handling the blocks in such manner that they will be presented successively at various inclinations with respect to the boring and tufting tools, to the end that the tufts when seated will extend at an inclination to the face of the block. The particular mechanism in the present machine is formed so that every tuft will be inclined, those on opposite sides of a central transverse line inclined, respectively, longitudinally in opposite directions and those on opposite sides of a longitudinal line inclined, respectively, transversely in opposite directions; but the mechanism may be modified within the scope of my invention to vary the angles and inclinations of the tufts to suit the fancy and the particular character of brush to be bored as regards the disposition and arrangement of the tufts. The essence of the invention resides in improved automatic means for feeding the block in such manner that the tufts may be set at an inclination to the face of the block, to the end that at the sides and ends of the blocks, or either, the tufts will flare or spread outward.

The invention consists also in certain novel details in the mechanism, as will be fully pointed out in the claims, which mechanism may be employed to automatically feed the blocks to receive the tufts at right angles to the face of the block as well as at an inclination.

The invention also consists in an improved magazine or holder for the bristles, formed to permit the supply of bristles to be replenished without stopping the operation of the machine.

The invention also consists in a suction apparatus coöperating with the borer to draw in the borings and shavings and convey them from the machine.

The invention also consists in an improved mechanism coöperating with the feeding mechanism for automatically stopping the operation of the machine when a set of blocks has been bored and filled.

The invention also consists in the details of construction and combination of parts hereinafter described and claimed.

While in the accompanying drawings I have shown my feeding mechanism applied to a brush-machine in which a boring-tool operates by the side of a tufting-tool, the mechanism operating to handle two blocks at once, one beneath the borer and the other beneath the tufter, it is obvious that the feeding mechanism is applicable as well in cases where the boring is accomplished in a separate machine and may be employed to either feed single blocks to be bored or bored blocks to be tufted, or both.

Figure 2:
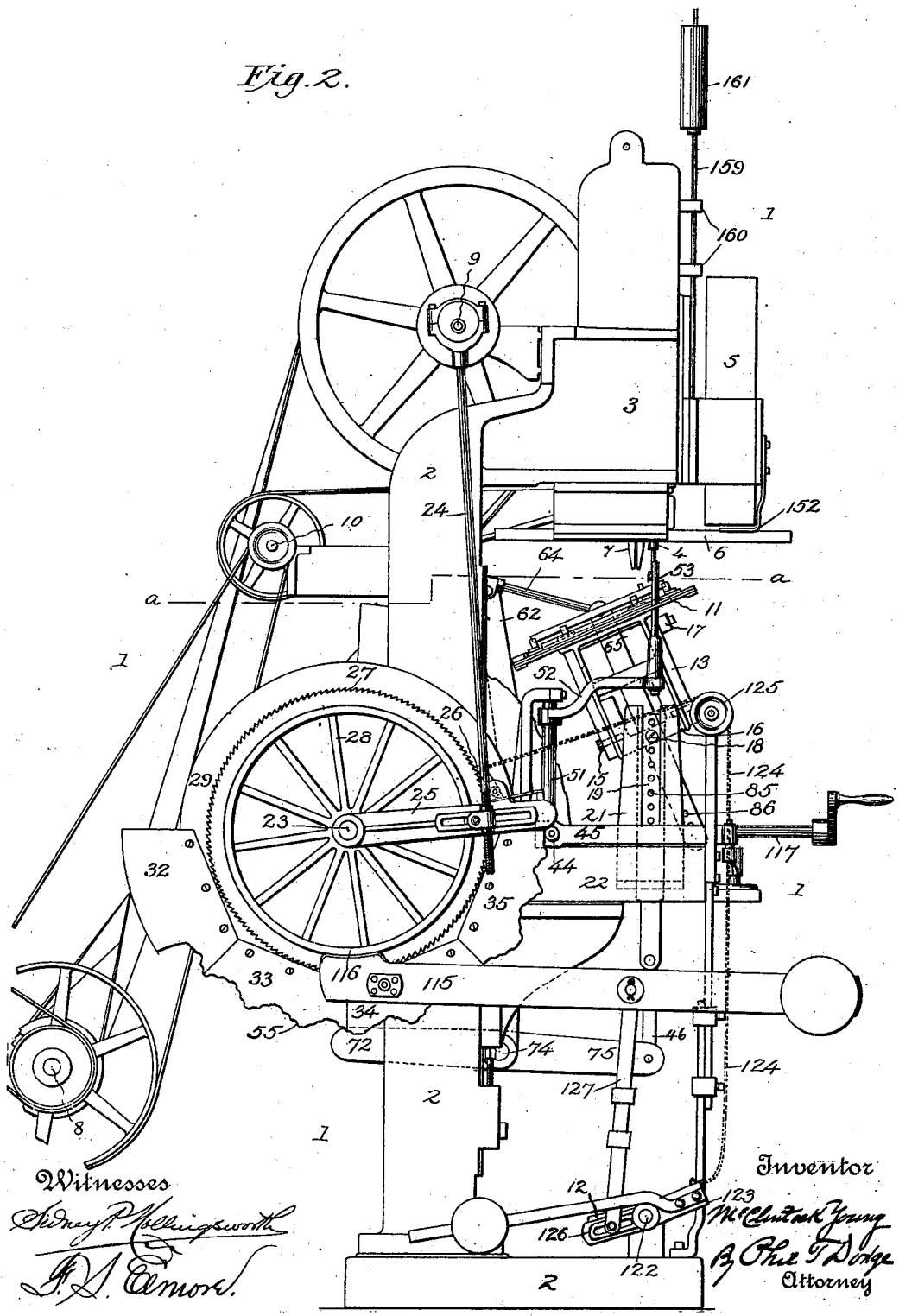
Figure 3:
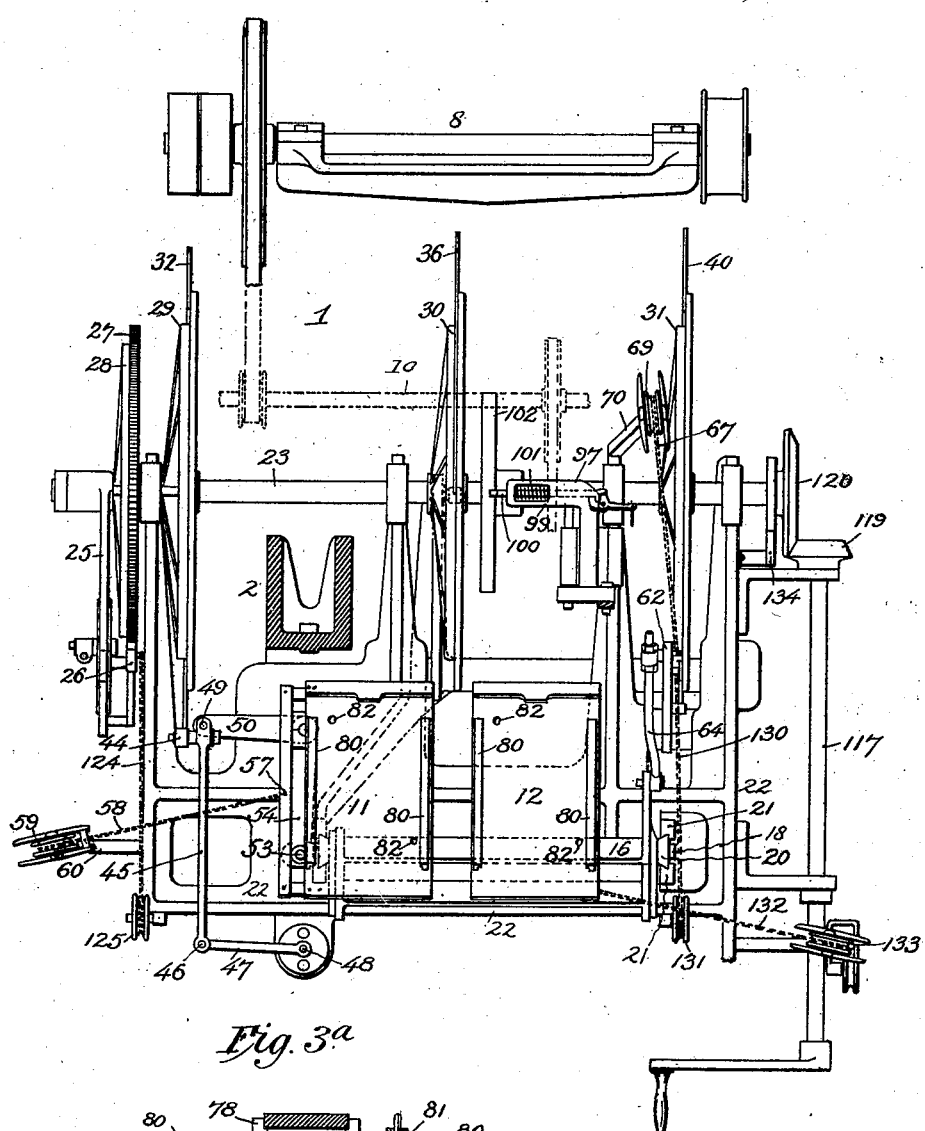
Figure 4:
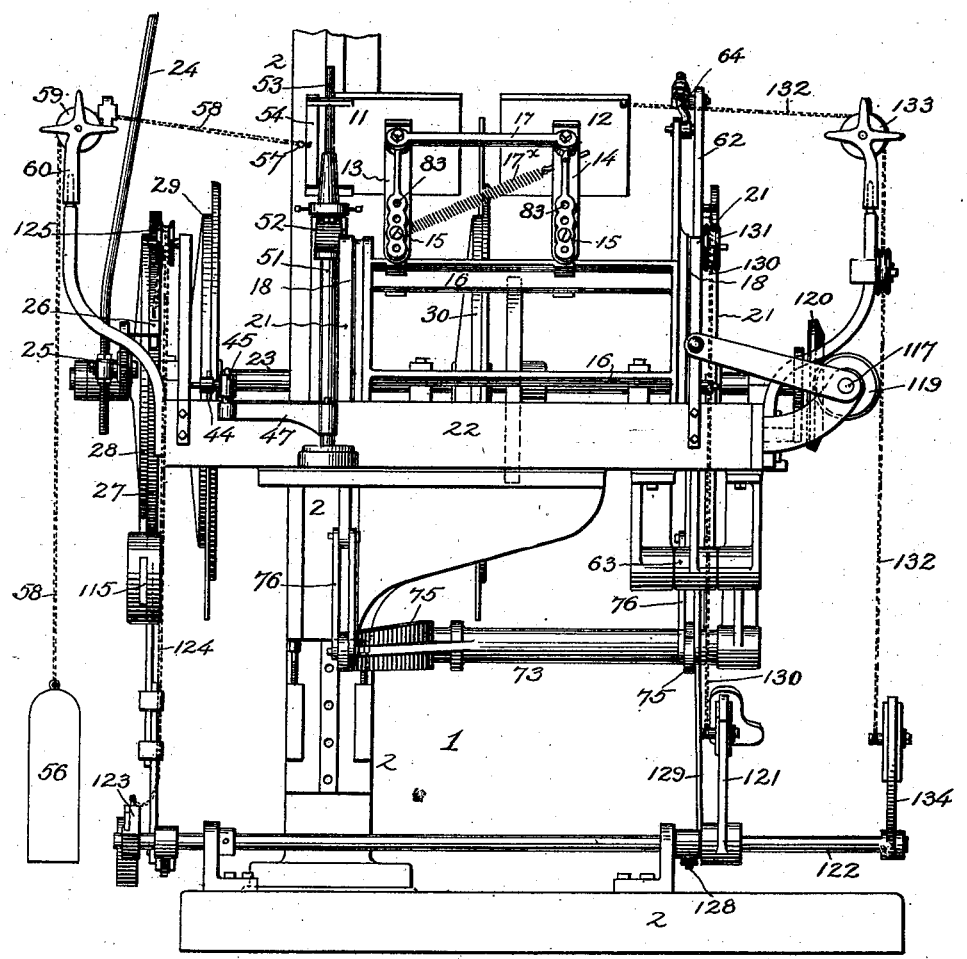
Figure 19:
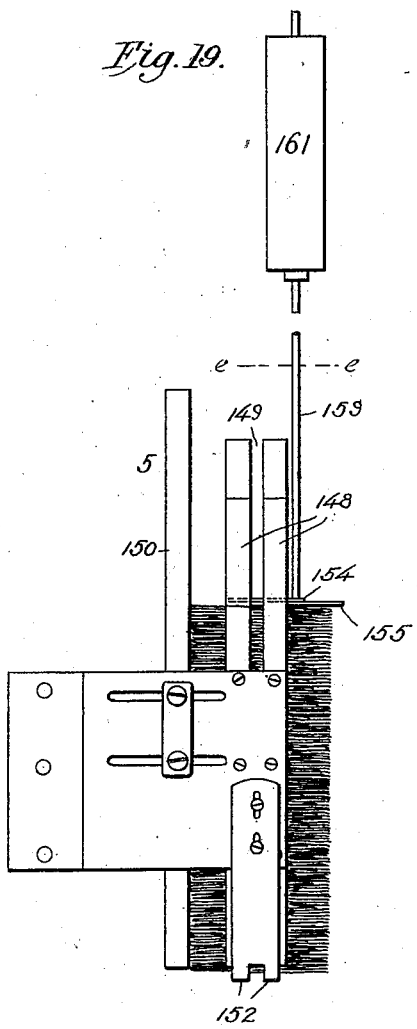
Figure 20:
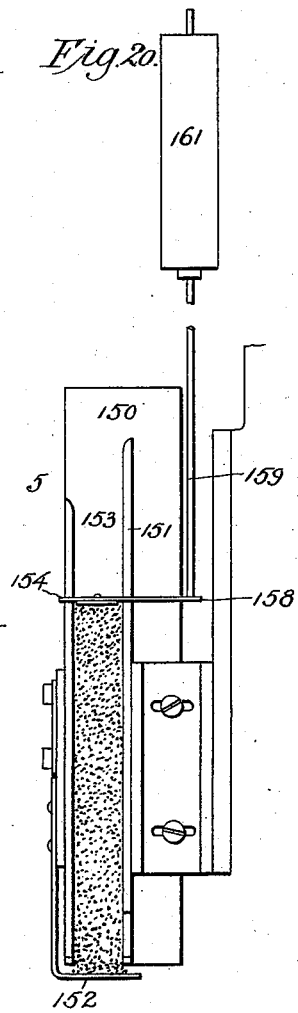
Figure 21:
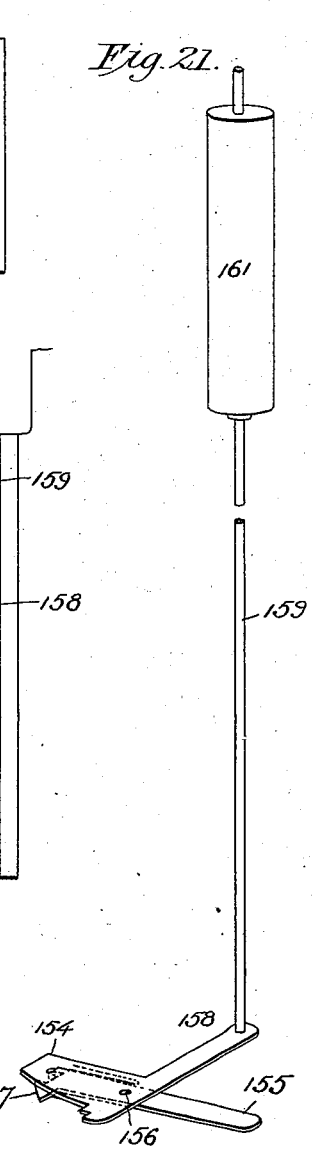
Figure 22:
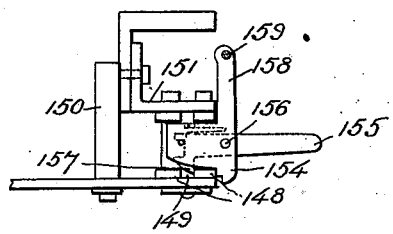

Referring to the drawings, Figure 1 is a side elevation of my improved feeding mechanism, shown as applied to a brush-machine in which the blocks are bored and filled. Fig. 2 is a similar view from the opposite side. Fig. 3 is a horizontal sectional plan view, looking downward, on the line *a a* of Fig. 2. Fig. 3ᵃ is a vertical transverse section on the line *b b* of Fig. 7. Fig. 4 is a front elevation of the feeding mechanism. Fig. 5 is a front elevation of the supporting-table for the brush-blocks, showing how it is constructed to admit of the various movements necessary to sustain the blocks at inclinations with respect to the tools. Fig. 6 is a vertical sectional elevation on the line c c of the preceding figure. Fig. 7 is a top plan view of the parts shown in Fig. 5. Fig. 8 is a perspective view, on an enlarged scale, of a detail for controlling the transverse movements of the tables. Fig. 9 is a top plan view of a bored block, showing the disposition and inclination of the holes. Fig. 10 is a side elevation of the clutch-operating mechanism for automatically arresting the motion of the operative parts of the machine. Fig. 11 is a front elevation of the same. Fig. 12 is a perspective view of a detail of the same. Fig. 13 is a top plan view of a supporting-table of another form to feed the blocks to receive the tufts and holes at right angles. Fig. 14 is a front elevation of the same, showing the suction apparatus for the boring-tool. Fig. 15 is a side elevation of the same. Fig. 16 is a vertical sectional elevation on the line d d of Fig. 13. Fig. 17 is a bottom plan view of a detail of the supporting-table. Fig. 18 is an elevation of the suction apparatus for the boring-tool on an enlarged scale, the front of the casing being removed to expose the fan. Fig. 19 is a front elevation of the magazine or reservoir for the bristles. Fig. 20 is a side elevation of the same. Fig. 21 is a perspective view of the follower for the magazine. Fig. 22 is a horizontal sectional plan view on the line e e of Fig. 19.

In the accompanying drawings, referring to Figs. 1 to 8, 1 represents a brush-machine such as represented in my patent above referred to, to which reference may be had for a more detailed description than is here given. The machine embodies a frame 2, having an overhanging bracket 3, in which is mounted a rotary vertically-reciprocating boring-drill 4, a fiber-magazine 5, a horizontally-acting tuft-separating slide 6, and a vertically-acting tuft-driving slide 7, the latter acting at the side of the drill to seat a separated tuft into a hole in a bored block corresponding in position to the hole being formed by the drill in a blank block. The foregoing mechanisms receive motion from a main driving-shaft 8 at the base of the frame, from which motion is imparted to a horizontal transverse shaft 9 at the top of the machine, which drives the tufting mechanism, and to a horizontal transverse shaft 10, which operates the borer. These parts, with the exception of the magazine, may be and are of the construction described in said patent and in themselves form no part of the present invention except as peculiarly combined with my improved devices.

The feeding mechanism for the blocks is sustained by the frame of the machine at the front, beneath the borer and tufter, to successively present the two blocks automatically to predetermined positions, one beneath the borer to be bored and the other beneath the tufter to receive the tufts successively in the holes corresponding to those being simultaneously formed in the other block. The mechanism is so formed and operated that the blocks in their successive positions beneath the tools are held at an inclination to the same, but at the same distance therefrom, in order that the tufts when seated will flare or spread at the proper points and the holes will be of the same depth. In order to effect this, it is necessary to provide for the lateral and longitudinal movements of the blocks in the arcs of circles described from centers below the blocks and at the same time provide for a movement of the blocks to and from the tools, so that under all the various positions of the blocks longitudinally and laterally the points operated on will be at the same distance from the tools. This is accomplished by means of two flat block-sustaining tables 11 and 12, adapted to sustain the brush-blocks, one beneath the borer and the other beneath the tufter. The tables are fixed, respectively, to the upper ends of two rectangular frames 13 and 14, pivoted each at its lower end on horizontal fore-and-aft axes 15 to the upper edge of a transverse vertical frame 16 and connected together by a link 17 to cause them to move in unison. The frame 16 is pivoted at its ends on horizontal axes 18, extending at a right angle to the axes 15, respectively, to two vertical slides 19 and 20, mounted in dovetailed grooves in two fixed standards 21, rising from a horizontal projecting portion 22 of the main frame. As a result of this construction the tables are movable longitudinally around the axes 18 as centers, transversely on the axes 15 as centers, and vertically in the guide-standards 21, so that by means of appropriate mechanisms, now to be described, for controlling these movements the blocks on the tables may be presented at the proper predetermined positions to receive the holes and tufts inclined with respect to the face of the block.

The various motions are transmitted to the tables from a horizontal transverse cam-shaft 23, mounted in bearings at the rear of the frame and driven step by step from the upper shaft 9 by means of an eccentric-rod 24. The eccentric-rod is connected with the outer end of a vibrating lever 25, mounted at its inner end loosely on the cam-shaft and carrying a pivoted driving-dog 26, adapted to engage teeth 27 on a wheel 28, fixed on the shaft. By this construction the vibratory motion given the lever by the vertical reciprocation of the eccentric-rod will advance the cam-shaft step by step.

On the cam-shaft are mounted three cam-wheels 29, 30, and 31, Fig. 3, carrying, respectively, a series of detachable segmental cam-plates 32 33 34 35, 36 37 38 39, and 40 41 42 43, the cams on wheel 29 adapted, through suitable connections, to move the tables transversely on axes 15, the cams on the central wheel 30 adapted to move the tables vertically, and the cams on wheel 31 adapted to move the tables longitudinally on axes 18. The cams on wheel 29 act on a friction-roller 44, Figs. 2, 3, and 8, on the rear end of a horizontal bar 45, having its opposite end mounted loosely on a vertical stud 46 on the outer end of an arm 47, pivoted at its opposite end on a vertical axis 48 on the frame. The rear end of bar 45 is mounted loosely on a vertical stud 49 on the outer end of an arm 50, fixed at its opposite end to a vertical shaft 51, mounted in bearings in the frame and carrying at its upper end a forwardly-extending arm 52, having on its end a vertical pin 53, extending in a longitudinal slot 54 in the side of table 11. By means of this mechanism when the roller is pushed forward by the cam-surfaces the pin 53 will be thrown to the right, Fig. 3, and will move the table transversely on the axes 15, the pin and slot permitting the table to move longitudinally, as will be presently described. By connecting the bar 45 at its forward end to pivoted arm 47 the latter in connection with parallel arm 50 will form a "parallel movement" and will act to preserve the same relative positions of the face of the roller and the surface of the cam, so that the roller will at all times rest flatly against the cams. The cam-surface acting on roller 44 extends alternately outward and inward to move the table alternately to the right and left, and each outward and inward surface is composed of a series of curved depressions 55, in which the roller rests while the cam is at rest to permit the borer and tufter to operate. These curved depressions form, in effect, seats or sockets for the roller, and tend, when the roller rests therein and the tools are operating, to maintain the parts temporarily in fixed relations. The outwardly-extending surfaces of the cam act to positively move the tables to the right, as described, and when the inwardly-extending surfaces arrive opposite the roller the table is positively moved in the opposite direction and the roller held in contact with the cams by a weight 56, connected to the side of the table, as at 57, Fig. 4, by a chain 58, passing over a guide-pulley 59, mounted on an arm 60, projecting outward from the frame at the left side. This weight acting on the table tends to pull it at all times in a direction opposite the movement given by the outwardly-extending cam-surfaces on wheel 29, and the table acting on the pin holds the roller closely against the cam.

To prevent the table from being thrown beyond the proper positions by a too-sudden action of the pin 53 under the influence of the operating-cams, I connect the frames 13 and 14 by a spiral spring $17^x$, extending from the lower end of frame 13 to the upper end of the adjacent frame, so that the tendency of the spring will be to draw the tables to the left in opposition to the action of the cam. The spring thus acts with a cushioning effect on the movement of the tables to the right.

The movements of the tables under the influence of the cams and weight just described determine and control the transverse spaces between the holes, while cam-wheel 31 and the devices operated thereby, now to be described, control the spaces between the holes in a longitudinal direction. Hence by a cooperation of these mechanisms and a proper relative formation of the cams holes may be bored and tufted in any desired order either in regular parallel rows or irregularly.

The cams on wheel 31 for controlling the longitudinal movements of the tables act on a friction-roller 61, Fig. 1, on the side of a lever 62, pivoted at its lower end to the frame, as at 63, and jointed at its upper end to the rear end of a link 64, whose opposite end is pivoted to the upper end of an arm 65, extending upwardly from the end of frame 16. As a result, the frame 16 will be rocked forward on its axes when the cam-wheel is turned to carry its cam-surfaces past the roller and will gradually feed the tables forward to space the holes in a longitudinal direction. The cam on this wheel for effecting this movement has its surface extending gradually a greater distance from the center of the wheel and is made up of a series of irregular projections and depressions formed with relation to the surface of the cams on wheel 29 to cause the table to occupy such positions as will insure the operation of the tools at the desired predetermined points in the block. The rearward movement of the table in opposition to the movement given them by the cams just described is controlled and effected by a weight 66, connected with the upper end of lever 62 by a chain 67, passing over a pulley 69, mounted in an arm 70, extending upward from the frame at its rear.

In their transverse and longitudinal movements the tables carry the blocks in curved paths beneath the borer and tufter, as shown in Figs. 5 and 6, the result being that when the tables are moved forward from the position shown in Fig. 1 (which is the starting position) to a medial position, as shown in Fig. 6, the center of the block will be at a greater distance from the tools, so that unless some means are provided to meet this condition the holes will not be of uniform depth and the tools will be unable to operate properly. This is overcome by providing for the vertical movement of the tables to preserve at all times the same distance between the tools and the portion or point of the block vertically beneath them, notwithstanding changes in the position of the blocks longitudinally or transversely. As before stated, this vertical movement of the table is controlled by the central cam-wheel 30, its cam, Fig. 1, acting on a roller 71 on the rear end of an arm 72, fixed to a horizontal frame 73, mounted on a horizontal transverse axis, as at 74, in the lower part of the main frame. Arms 75 extend forward from this frame and have their forward ends jointed, by means of links 76, to the lower ends of the vertical slides 19 and 20, the result being that when the rear end of the arm 72 is lowered by the cam the slides will be elevated and will raise the tables through their connection with the frame 16. The cams on the central wheel 30 are so proportioned with reference to the other cams that when the tables pass forward from the starting-point to the medial position they will be moved gradually upward and will be moved gradually downward from this point to the opposite inclined position and will act also in this manner with respect to the transverse movements, so that in whatever position the blocks are presented by the tables, whether horizontal, as in Figs. 5 and 6, or inclined, as in Fig. 1, the points on the blocks vertically beneath the tools will be at the same and proper distance to have the holes bored and the tufts seated to the proper and uniform depth.

The blocks bored and tufted in the present machine are of flat form with pointed ends, as shown in Fig. 9, and are clamped firmly by eccentric levers 77, Fig. 7, against lugs 78 on holding-plates 79, Fig. 3ª, which latter are inserted between overhanging ribs 80 on the tables and locked thereon removably by spring-pins 81, mounted on the block-holding plates and adapted to engage in holes 82 on the tables. These block-holders are interchangeable in the ribs, so that when one of the operations of boring and filling is completed the holder with the bored block is set beneath the tufter to be filled and the filled block removed from its holder, a new blank clamped in the holder, and the latter set beneath the borer. The holders in addition to being interchangeable from one table to the other, as described, are also reversible on the tables, the latter being provided with additional sockets or holes 82 at the opposite ends of the tables to receive the spring fastening-pins. The purpose of this is to reduce the number of cam-surfaces on the several wheels, which may be formed to cause the apparatus to feed the blocks only up to their central point, and as the arrangement of the holes in the other half of the blocks is in most cases the same the holders may be reversed and the operations started anew to complete the remaining half of the blocks.

The present machine has the cams on the several wheels so formed relatively that the pointed brush-block will be bored and filled with the holes all at an inclination to its face and disposed as shown in Fig. 9, the holes at the extreme ends being given the greatest inclination outward and the holes being bored and tufted in the order indicated by the dotted leader-line in said figure. The order, however, in which the holes are bored and tufted may be varied to suit the fancy by modifying and changing the cams and their relations to each other. For instance, the holes may be bored and tufted in regular transverse rows, inclining gradually in opposite directions toward the ends from a central transverse line, instead of irregularly, as shown. I propose to form the cam-surfaces of separate segmental plates, as before alluded to, detachably connected by bolts or otherwise to the respective wheels, one forming a continuation of the other and constituting, in effect, composite cams. This is advantageous in that it is far less expensive than if they were formed directly on the wheels and integral therewith, and it admits of the tempering of the cam-plates with little trouble. Further, as it is seldom necessary in connection with the mechanism shown to have the cams extend entirely around the wheels in order to feed the blocks properly the composite cams are of peculiar advantage.

In order that the angles of the holes and tufts may be varied, I provide for the adjustment of the axes on which the lateral and longitudinal frames sustaining the brush-blocks rock. This is accomplished by forming in the frames 13 and 14 a series of holes 83, adapted to receive the pivots 15, by which the frames are pivoted, and I also form in the vertical slides 20 and ends of the frame 16 a series of holes 85 and 86 to receive the pivots 18, by which the frame 16 is pivoted. In this way the curvature of the arcs in which the tables move back and forth and transversely may be increased or diminished, which would correspondingly increase and diminish the angles of the holes in the block and the tufts seated therein. If, for instance, it is desired to diminish the longitudinal obliquity of the holes, the pins 18 would be set lower in the slides and frame, as indicated by dotted lines in Fig. 5. If it is desired to increase the transverse obliquity, the pins 15 would be changed to a higher position in the frames 13 and 14 and the frame 16 would be adjusted vertically with respect to the slides in order to preserve the proper distance between the tools and the blocks. It is seen, therefore, that the longitudinal and transverse inclinations of the holes may be varied independently of each other.

In order that the operative mechanisms may be stopped automatically when a set of blocks has been bored and tufted, to the end that the finished brush may be removed, the bored block placed beneath the tufter, and a new blank placed beneath the borer to begin operations anew, I provide the upper shaft 9 with a clutch mechanism, Figs. 1, 10, 11, and 12, adapted to be operated from the cam-shaft when the latter arrives at a certain point in its rotation. This clutch comprises a spring-dog 88, carried by a loose pulley 89 and held by a spring 90 in such position that it will engage angular pins 91 on a disk 92, fixed to the shaft, and thus transmit motion from the pulley to the shaft. The dog is thrown out of engagement with the pins to disconnect the shaft by a swinging roller 93, carried on the upper end of an elbow-lever 94, pivoted, as at 95, to swing the roller inward in the path of the end of the dog. The opposite end of the elbow-lever is connected by a link 96 to a frame 97, Fig. 12, pivoted, as at 98, to the frame of the machine and provided with an extension 99, in which is mounted a sliding pin 100, projected normally outward by a spring 101. The end of the pin overlies and rests on the rim of a wheel 102, fixed on the cam-shaft, and the pin is maintained in contact therewith by a torsional spring 103, Figs. 1 and 10, acting on the elbow-lever 94. When the parts are in this position, the rim of the wheel prevents the clutch from being thrown into action, and the loose pulley is connected with the shaft to operate the machine. The clutch is operated to disconnect the shaft when a notch 104 in the rim of the wheel arrives opposite the end of the pin, at which time the latter will drop therein under the influence of the torsional spring and will by the connecting-link described swing the roller 93 in the path of the clutch-dog, and thereby disconnect the shaft. The notch in the wheel is arranged with reference to the cam-wheels and the mechanisms operated thereby so that it will arrive beneath the pin at the moment that the last holes in the blocks are bored and tufted, the result being that when the blocks are completed the machine is stopped. It is sometimes necessary to quickly stop the machine in the midst of the operations and before the notch arrives beneath the pin and then to again start the machine to continue operations. This I accomplish by suitable mechanism operated by hand for manually operating the clutch at any time. The mechanism comprises an elbow-lever 105, Figs. 10 and 11, pivoted on the link 96 adjacent to the end of the spring-pin, to which one arm of the lever is jointed, while the other arm is connected by a link 106 with a second elbow-lever 107, pivoted, as at 108, to the under side of the elbow-lever 94 and connected by a rod 109 with a hand-lever 110. This hand-lever is pivoted at its upper end on a horizontal rock-shaft 111, mounted in bearings 112 on the frame of the machine, the outer end of the shaft being provided with a handle 113 for turning it and formed at its opposite end with a crank-arm 114, extending alongside the upper arm of the elbow-lever 94, beneath the roller carried thereby. By this mechanism it will be seen that the spring-pin may at any time be retracted by hand-lever 110 to free the rim of the wheel, which action will be quickly followed by the descent of the pin under the action of the torsional spring and the swinging of the roller in the path of the clutch-dog, thereby disconnecting the shaft and stopping the machine. To again start the machine, it is but necessary to withdraw the pin and turn the rock-shaft 111, causing the crank-arm to positively swing the elbow-lever outward and move the roller out of the path of the clutch-dog.

In the boring and filling operations the brush-blocks are fed forward in the manner described from the position indicated in Fig. 1, and at the completion of the operations the machine comes to a rest with the table inclined forward and downward, as shown by dotted lines in said figure. In this position the blocks are changed about for the next operation, after which the cam-wheels are returned to their starting position and the table returned to its original position. This is accomplished manually by first disengaging the rollers from the cams, the driving-pawl from its ratchet-wheel, and a brake-lever 115, Fig. 2, from a brake-surface 116 on the ratchet-wheel, and then turning the cam-wheels back by a shaft 117, mounted in bearings on the frame with its forward end provided with a crank for turning it. The rear end of the shaft carries a bevel-gear 119 and engages a bevel-pinion 120 on the cam-shaft. The cams and the other parts are freed from their engaging mechanisms by a foot-lever 121, projecting forward near the right side of the machine from a horizontal rock-shaft 122, mounted in the base of the frame. At its left end the shaft is provided with a forwardly-extending arm 123, connected by a chain 124, passing over a pulley 125, with the driving-pawl 26 in such manner that when the foot-lever is depressed the chain will be drawn taut and will lift the pawl from the teeth on the ratchet-wheel.

Extending rearwardly from the shaft is an arm 126, jointed to the lower end of a vertical link 127, whose upper end is jointed to the brake-lever 115, by which arrangement the lever will be rocked when the foot-lever is depressed and free the wheel 28 of friction. At a point adjacent to the foot-lever the shaft is provided with an additional rearwardly-extending arm 128, connected by a vertical link 129 with the forwardly-extending arm 75 on the horizontal frame 73, before alluded to as controlling the vertical movements of the tables. These connections act on the depression of the foot-lever to depress the rear end of the horizontal frame 73 and lower the friction-roller 71 out of engagement with the cams on the central wheel.

Roller 61 for controlling the longitudinal movements of the tables is held clear of its cams when the foot-lever is depressed by a chain 130, Fig. 1, passing over a pulley 131 and connected at one end with the foot-lever and at the opposite end with the lever 62, the arrangement being such that when the foot-lever is fully depressed the lever 62 will be held forward, thereby freeing the cam-wheel 31 of its engaging roller.

Roller 44 is held free of its cams by means of a chain 132, passing over a pulley 133, with its lower end fixed to an arm 134 on the rock-shaft and its upper end attached to the outer edge of table 12. This chain acts through the depression of the foot-lever to hold the tables at their forward positions, which they assume at the completion of their operations, and through the engagement of table 11 with pin 53 holds the roller 44 free of its cams.

When the foot-lever is depressed and the parts operated as described, the tables are held forward against the influence of their returning-weights and the various cam-wheels and ratchet-wheel freed of all engaging parts. The hand-crank may then be freely turned, which will result in the turning of the cam-shaft and wheels back to their former starting position, which is determined by a spring-pawl 134, Fig. 1, in position to engage a notch in a disk on the cam-shaft. After the wheels are thus turned back the foot-lever is released to permit the rollers to contact with their cams, the pawl to engage the ratchet-wheel, and the brake-lever to engage the brake-surface. Simultaneously the tables will be drawn rearward by their weights to their former starting position, as shown in Fig. 1.

In Figs. 13 to 17, inclusive, I have represented a feeding-table of different form adapted to be operated by the mechanism described and acting to present the blocks automatically in their different positions beneath the borer and tufter. This table differs in its action from that just described for inclined work in that all the holes will be bored and tufted at right angles to the face of the blocks. Hence there is but one change in the operating mechanism—namely, the central cam-wheel and its connections for controlling the vertical movements of the other table, which are here omitted. The present table is flat and is fed in two directions only—transversely for the lateral spacing of the holes and fore and aft for the longitudinal spacing. The disposition of the holes may be varied, as in the first instance described, and may be set either in regular rows or in irregular arrangement or in curved lines, as shown. The table is sustained by a horizontal bed 135, mounted on the upper ends of standards 136, connected at their lower ends to the horizontal projecting portion of the main frame, and comprises a flat sustaining-plate 137 and an underlying relatively-movable skeleton frame 138, which is movably mounted on the bed-plate. The sustaining-plate has on its under side friction-rollers 140, bearing on opposite sides of central transverse rail 141 of the skeleton frame, and the latter is provided with a longitudinally-extending side rail 142, which extends between friction-rollers 143 on the upper surface of the bed-plate. As a result of this construction the sustaining-plate is movable both longitudinally and laterally, its former movement due to the longitudinal movement of the skeleton frame and the transverse movement of the plate due to its relative movement on the skeleton frame. The latter movement of the table is controlled by cam-wheel 29 and pin 53, before described, the latter engaging in a longitudinal slot 144 in the end of the sustaining-plate, while the longitudinal movement is controlled by cam-wheel 31 and lever 62, which is connected by the link 64, before described, to the side of rail 142. The table feeds forward horizontally, taking its various positions under the influence of its controlling mechanisms to insure the holes being bored and tufted in the proper predetermined positions. In substituting this feeding-table for that first described the vertical guide-plates are detached from the projecting portion of the frame and the standards 136 with the horizontally-acting table substituted, the pin 53 being inserted in the slot 144 in the table and the link 64 connected with the side rail 142. It is seen, therefore, that no additional mechanism is required for operating this table, its two movements being received from the same devices that impart to the other table its corresponding movements.

In connection with the table operating horizontally in the manner described, as illustratd in Figs. 13 to 17, inclusive, I propose to employ a suction apparatus to coöperate with the drill to draw in the borings and deliver them from the machine. This apparatus is illustrated in Fig. 18, and consists of a rotary fan-wheel $145^{\times}$, fixed to the shank of the drill and surrounded by a casing 146 to form a chamber into which the drillings are drawn from the surface of the block around the point where the drill operates. The lower end of the casing is open and extends in proximity to the block to closely surround the hole, while at its upper end the casing communicates with a conveyer-pipe 147, leading from the machine, by which construction the drillings instead of being scattered in the working parts of the machine are collected and delivered to any desired point.

In order that the fiber-magazine may be filled without interrupting the operation of the machine, I form the same with one side open and combine therewith a follower adapted to rest on the column of fibers, but arranged to be turned laterally from the box when the supply of fibers is to be replenished. As shown in Figs. 19, 20, 21, and 22, the magazine is open at its side and top, and consists of a front wall comprising two vertical plates 148 with a space 149 between them, a side wall 150, and a rear wall 151. The fibers are placed with their ends abutting against the side wall and rest on two fingers 152, extending across the bottom of the magazine, between which the separating-slide acts to separate from the bottom of the mass a quantity of fibers sufficient to form a tuft, as described in my patent above referred to. The follower 153 referred to comprises a flat plate 154 with one side straight and extending along the inner face of the rear wall, an end extending along the side wall of the box, and a curved edge extending at the inner side of the front wall, a latch 155 being pivoted, as at 156, to the under side of the plate and formed with a nose 157, adapted to extend in the space 149 in the front wall of the magazine. This latch prevents the follower from accidentally escaping from the magazine, but permits it to move freely up and down therein to press the fibers that they may be separated at the lower end of the mass to form the tufts. The plate has an arm 158, extending rearwardly, which is attached to the lower end of a vertical cylindrical rod 159, sliding vertically in guiding-openings in lugs 160, Fig. 1, projecting from the frame of the machine, the upper end of the rod being provided with a weight 161 to hold the follower with the requisite pressure on the mass of fibers. From this construction it will be seen that the follower is movable freely up and down in the magazine and is also movable laterally on the rod 159 as an axis and may be turned outward from the box by first swinging the latch on its pivot to withdraw its nose from between the vertical plates. The refilling of the box should be accomplished before the previous supply of fibers is wholly exhausted, so that there will be no interruption in the tufting operations, and it is accomplished by packing the new fibers in the magazine on the top of the follower, the hand being placed on the top of the mass and a slight pressure given, so that when the follower is withdrawn laterally from beneath the new fibers there will be no interruption of the downward pressure thereon. After the follower is thus withdrawn it is lifted vertically and again turned into the box on the top of the mass.

Having thus described my invention, what I claim is—

1. In a work-feeding mechanism the combination of a work-table, means for moving it longitudinally, means for moving it transversely and a single mechanism for moving the table vertically, said mechanism being common in its action to both the transverse and longitudinal movements of the table; whereby the means for moving the table vertically may operate simultaneously with the transverse and longitudinal movements to preserve a uniform distance between the operating-tool and the block.

2. In a work-feeding mechanism the combination with the vertically-movable swinging frame, of means for controlling its vertical movements, means for controlling its swinging movement, a second swinging frame mounted on the first and movable with relation to said swinging frame only at right angles to it, means for controlling the movement of the second frame, and a table sustained by the second frame.

3. In a work-feeding mechanism the combination with the vertically-movable slides, of means for controlling their vertical movements, a frame pivoted between said slides, means for controlling the pivotal motion of the frame, a second frame pivoted to the first to move at right angles to it, means for controlling the pivotal motion of the second frame, and a work-table sustained by the same.

4. In a work-feeding mechanism, the combination with a frame, of means for moving it vertically, work-tables sustained by the frame and movable with respect to the same on parallel axes, and a connection between said tables to cause them to move on their axes in unison.

5. In a work-feeding mechanism the combination with a vertically-movable frame, of a plurality of frames pivoted thereto on parallel axes, work-tables sustained by said pivoted frames, and a jointed connection between said frames.

6. In a work-feeding mechanism the combination of the swinging frame 16, a work-feeding table sustained thereby and movable at right angles to it, a controlling mechanism acting on the swinging frame, and a controlling mechanism acting on the table to move it with respect to the frame.

7. In a work-feeding mechanism the combination with a swinging frame, of a vertically-movable slide sustaining it, a work-table sustained by the frame to move at right angles to it, means acting on the slide to control its vertical movements, mechanism acting on the frame to control its movement relative to the slide, and mechanism acting on the table to control its movement relative to the frame.

8. In a work-feeding mechanism the combination with the two vertically-moving slides, of means for controlling their vertical movements, a rectangular frame sustained on a horizontal axis between the slides, means for controlling the movement of the frame on its axis, two vertical frames 13 and 14 mounted on the rectangular frame on horizontal axes at right angles to the same, pivotal connections between the vertical frames to cause them to rock in unison, work-tables sustained by the respective vertical frames and means acting on one of the tables for controlling the pivotal movement of the same.

9. In a work-feeding mechanism the combination with an operating-tool, of a work-table movable beneath the same on an axis, means for adjusting the axis with respect to the table to vary the curve in which the table moves, and means for adjusting bodily the table and axis with respect to the tool to preserve the proper distance from the same whereby the angle of the holes and tufts may be varied without changing the thickness of the brush-block.

10. In a work-feeding mechanism the combination with an operating-tool, of a frame pivotally mounted on an axis, a work-table sustained by the frame and movable with relation thereto at right angles to the movement of the frame, and means for adjusting the axis of the frame to and from the tool with reference to the table; whereby the curvature of the path of the table may be varied without changing the distance of the table from the operating-tool.

11. In a work-feeding mechanism the combination with the vertical slides and means for controlling their vertical movements, of a rectangular frame mounted between said slides on horizontal axes, means for adjusting said axes along the slides with respect to the frame, a work-table, and a frame sustaining the same and mounted on the rectangular frame on an axis at right angles to the axis of the rectangular frame.

12. In a work-feeding mechanism the combination with the vertical slides provided with a series of holes, of a rectangular frame also provided with a series of holes, pivot-pins adapted to extend in said holes to form a pivotal connection between the frame and slides, means for controlling the vertical movements of the slides, means for controlling the swinging movements of the frame, a second frame provided with holes, a pivot-pin adapted to extend through said holes and the first frame at right angles to the other pivot-pins, means for controlling the pivotal motion of the second frame, and a work-table sustained by the latter.

13. In a work-feeding mechanism the combination with a laterally and longitudinally swinging table formed with a longitudinal slot, of means for moving the table vertically, a pin extending in said slot, and means for moving the pin laterally; whereby the table will be subject to the action of the pin notwithstanding its vertical and longitudinal movements.

14. In a work-feeding mechanism the combination with a movable work-table of actuating devices therefor including a friction-roller, and a cam adapted to engage the roller and formed with inwardly-curved surfaces to receive the roller; whereby when the roller rests in said curved surfaces the table will be held firmly at rest.

15. In a work-feeding mechanism the combination with a laterally and longitudinally movable table, of vertical cam-wheels, laterally-acting devices engaged by one of the cam-wheels and acting on the table to control its lateral movement, and a vertical longitudinally-movable lever 62 engaged by the other cam-wheel and operatively connected with the table for controlling its longitudinal movements.

16. In a work-feeding mechanism the combination with a work-table movable laterally and longitudinally, of a cam-wheel, devices actuated thereby engaging the table to move it laterally, means tending to move the table in the opposite direction, a second cam-wheel, a longitudinally-movable lever engaged thereby, a link operatively connecting the lever with the table, and means acting on the lever and tending to move it in opposition to the cam.

17. In a work-feeding mechanism the combination with a table pivotally mounted to swing both laterally and longitudinally and movable vertically, of three cam-wheels, actuating devices operated by one of the cam-wheels and operatively connected with the table to move it laterally, actuating devices engaged by another of the wheels and operatively connected with the table to move it longitudinally, and actuating devices engaged by the third wheel and operatively connected with the table to move it vertically.

18. In a work-feeding mechanism the combination with a laterally-swinging table, of a longitudinally-swinging frame sustaining it, a vertically-movable slide to which the frame is pivoted, a cam-wheel and devices actuated thereby and engaging the table to move it laterally, a second cam-wheel and devices actuated thereby and connected with the frame to move it longitudinally, and a third cam-wheel and devices actuated thereby and connected with the slide to move it vertically.

19. In a work-feeding mechanism the combination of a movable work-table, actuating devices for controlling its movements, a rotary wheel, and a series of detachable cam-plates carried by the wheel with the edge of one forming a continuation of the other and engaging the actuating devices.

20. In a work-feeding mechanism the combination of a movable work-table, actuating devices for controlling its movements, a rotary wheel, and a series of segmental cam-plates detachably connected with the wheel end to end, with their edges forming a continuation one of the other and engaging the actuating devices.

21. In a work-feeding mechanism the combination with the movable work-table, of a rotary cam-wheel, actuating devices engaged by the cam-wheel and serving to move the table, driving mechanism engaging the wheel, means for disengaging the actuating devices and driving devices from the wheel, and means for turning the latter backward.

22. In a work-feeding mechanism the combination with a work-table movable in different directions, of a shaft, cam-wheels mounted thereon, actuating devices engaged by the cam-wheels and acting on the table, driving devices engaging the shaft, manually-operated means for freeing the cam-wheels and shaft of all engaging parts, and manually-operated means engaging the shaft for turning it backward.

23. In a work-feeding mechanism the combination with a movable work-table, of a prime rotary operating member, actuating devices engaged by the operating member and acting on the table, driving devices engaging the operating member, means for freeing the operating member of all engaging parts, and means for turning the same backward to a starting position.

24. In a work-feeding mechanism the combination with a vertically-movable work-table, of a rotary cam-wheel, actuating devices engaged by the cam and adapted to move the table vertically, manually-operated means for lifting the table to free the cam, and means for turning the cam backward.

25. In a work-feeding mechanism the combination with a work-table movable forward and backward and laterally, of cam-wheels, actuating devices engaged thereby and acting on the table, weights acting on the table in opposition to the cams, a foot-lever, a connection between the lever and the table, a connection between the lever and the actuating devices for moving the table forward, and means for turning the cam-wheels backward.

26. In a work-feeding mechanism the combination with a work-table movable in different directions, of a cam-shaft a cam-wheel thereon, actuating devices engaged by the same and acting on the table, a foot-lever connected with the actuating devices and with the table to free the shaft of engaging parts, a rotary hand-shaft and operative connections between it and the cam-shaft.

27. In a work-feeding mechanism the combination with a movable work-table, of an operating-shaft, actuating devices receiving motion from the shaft and acting on the table, a driving-shaft transmitting motion to the operating-shaft, a clutch on the driving-shaft, a clutch-operating member adapted to be moved to disconnect the clutch, a wheel on the cam-shaft provided with a rim, a pin resting thereon, a connection between the pin and clutch-operating member formed to hold the member free of the clutch when the pin rests on the rim, and a notch in the rim adapted to receive the pin; whereby when the pin enters the notch the operating member will be moved to disconnect the clutch.

28. In a work-feeding mechanism the combination with a driving-shaft, of a clutch for connecting and disconnecting the same, a cam-shaft receiving motion from the driving-shaft, cams thereon, a work-table operated by the cams to present the blocks in predetermined positions, a wheel on the cam-shaft, a clutch-operating device having a member sustained by the wheel to maintain the clutch connected, and means tending to depress said member to disengage the clutch, said wheel being formed to permit the said member to descend when the wheel arrives at a certain point in its rotation.

29. In a work-feeding mechanism the combination of a driving-shaft, a clutch for connecting and disconnecting the same, a cam-shaft receiving motion from the driving-shaft, cams thereon, a work-table operated by the cams, a wheel mounted on the cam-shaft, a movable operating member for the clutch, a pin connected with it and resting on the wheel, means for retracting the pin, means for operating the member to disconnect the clutch, and means for operating the member to again connect the clutch.

30. In a work-feeding mechanism the combination with a table provided with engaging projections and with a socket, of a block-holder adapted to interlock with the engaging projections, a locking-pin carried by the holder and adapted to engage the socket, and means for securing the block on the holder.

31. In a brush-block-feeding mechanism the combination with a table provided at opposite ends with sockets, of block-holders adapted to rest on the table, and provided with a pin arranged to engage in either of said sockets, and means for securing the block to the holder; whereby the holder is reversible end for end on the table.

32. In a work-feeding mechanism the combination with a movable work-table, of actuating devices therefor, a cam-wheel provided with a series of cam-surfaces adapted to engage the actuating devices and formed to feed the block to receive the tufts in one-half only, a block-holder sustained by the table, and means for connecting the same detachably with the table in reverse positions.

33. The combination with the fiber-reservoir, of a follower movable vertically therein and mounted to swing horizontally therefrom.

34. The combination with the fiber-reservoir open at its side and provided with a vertical groove, of a follower movable vertically therein, a latch carried by the follower and adapted to engage in the groove, a rod connected with the follower, and guiding-openings in which said rod is loosely mounted.

35. The combination with the fiber-reservoir, of a vertically-movable horizontally-swinging follower adapted to be turned on a vertical axis laterally from the box, and means for locking said follower in the box subject to its vertical movement.

36. In a work-feeding mechanism the combination of a work-table movable both longitudinally and transversely, means for controlling its longitudinal movement, means for controlling its transverse movement, and means independent of its transverse and longitudinal movements for moving the table vertically.

In testimony whereof I hereunto set my hand, this 23d day of April, 1900, in the presence of two attesting witnesses.

McCLINTOCK YOUNG.

Witnesses:
WILLIAM R. KENNEDY,
FABIUS S. ELMORE.